Dec. 20, 1960  R. O. BALOGH  2,965,191
TOWER VEHICLES
Filed Jan. 14, 1955  7 Sheets-Sheet 1

INVENTOR.
Roy O. Balogh
BY
ATTORNEY

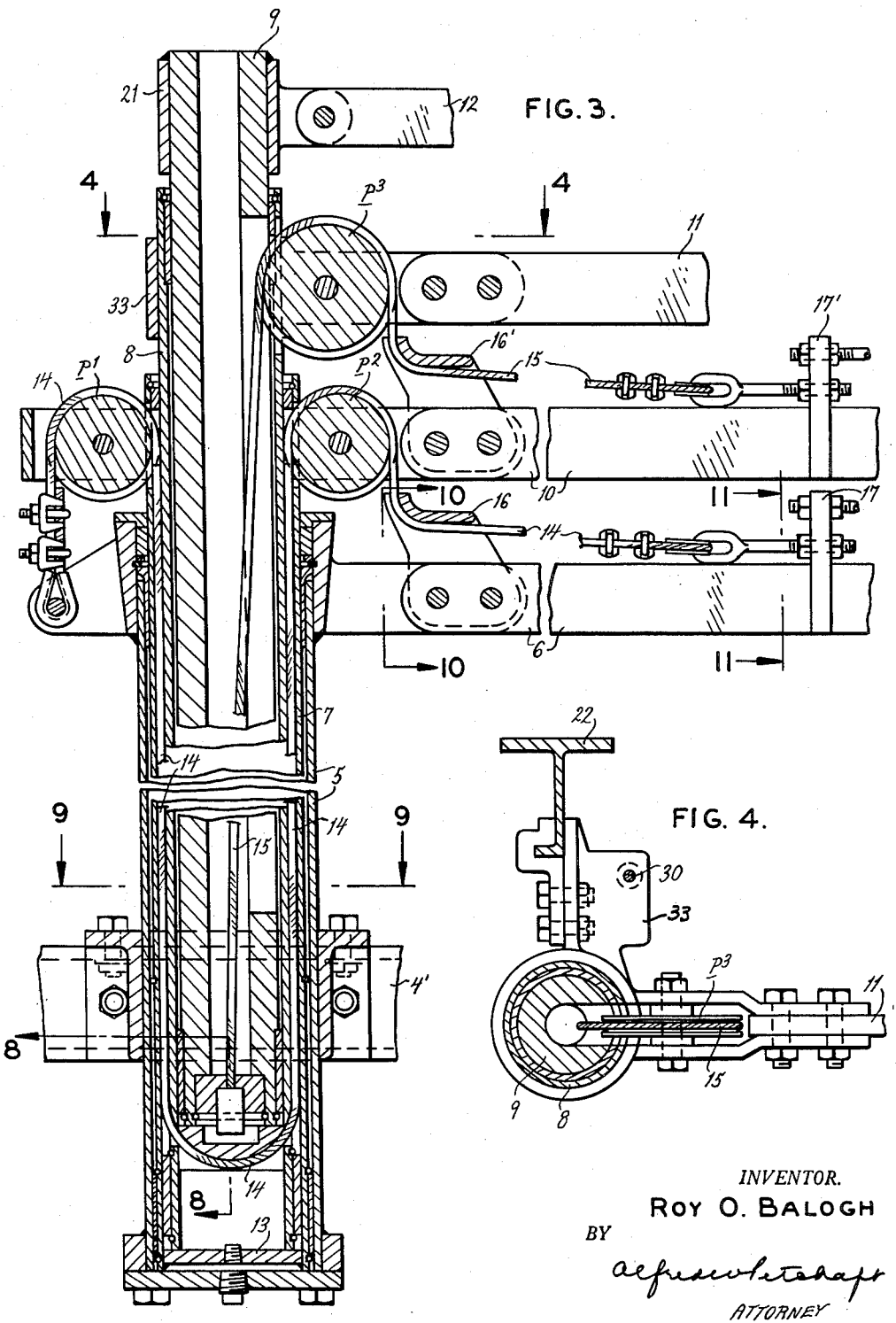

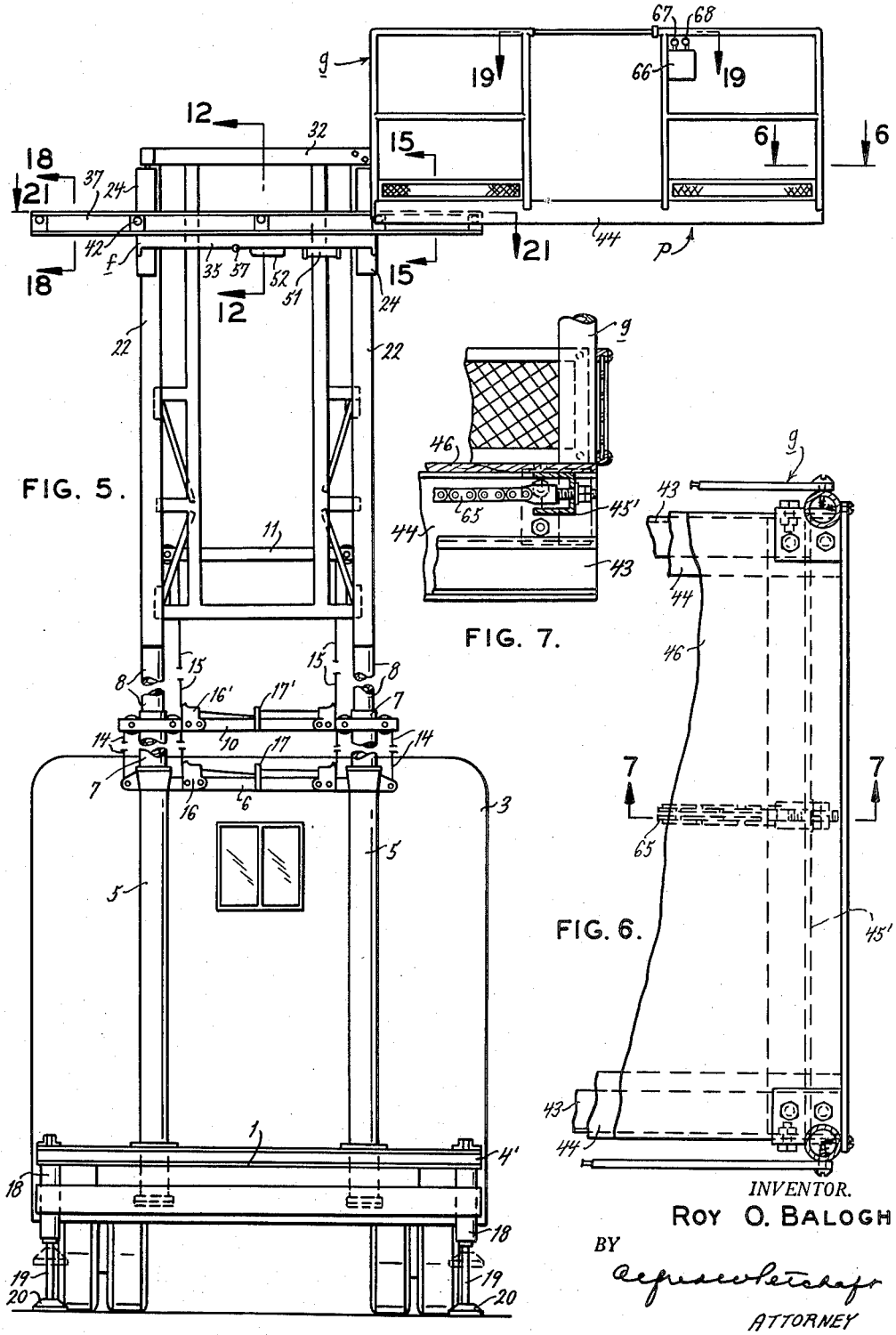

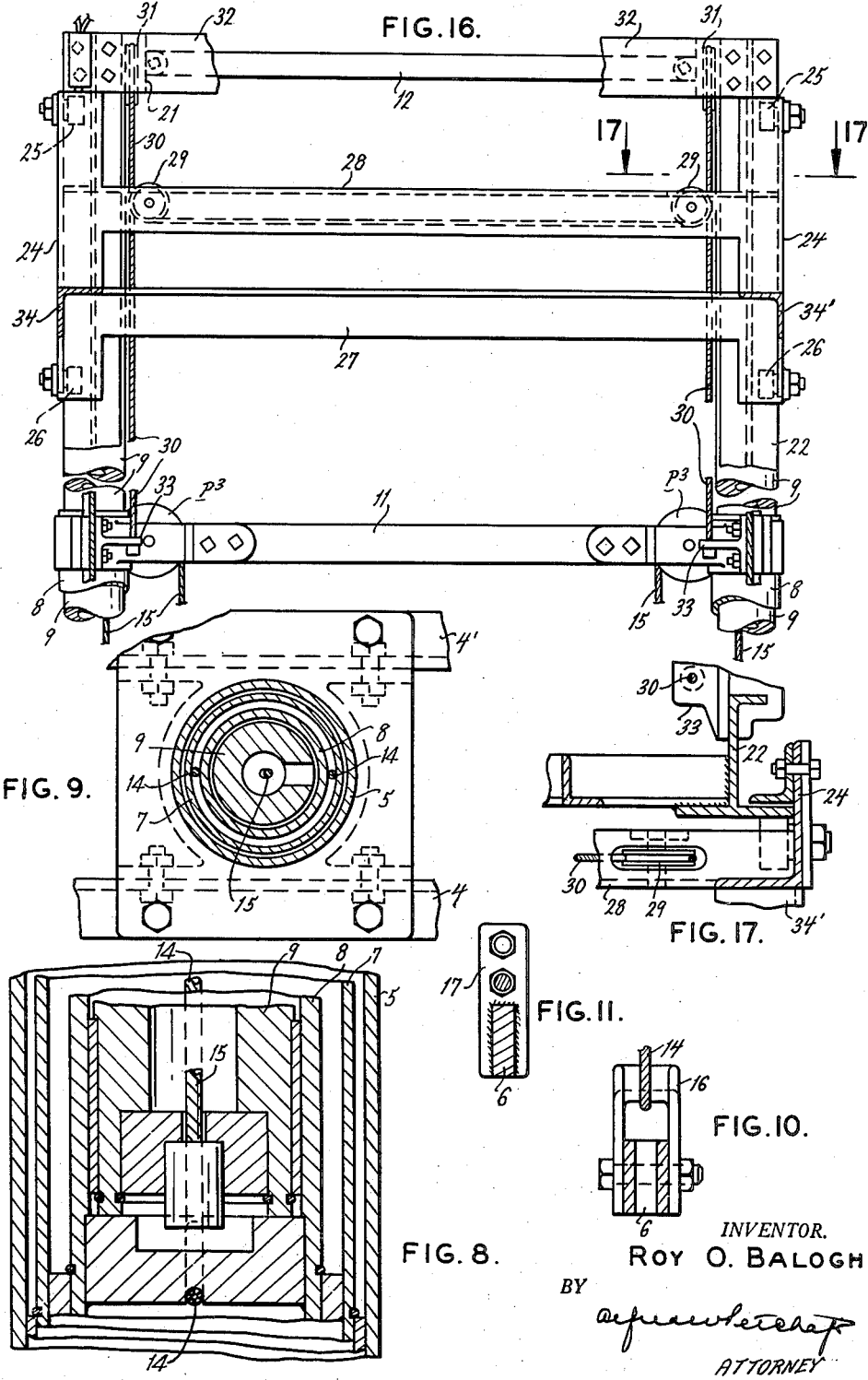

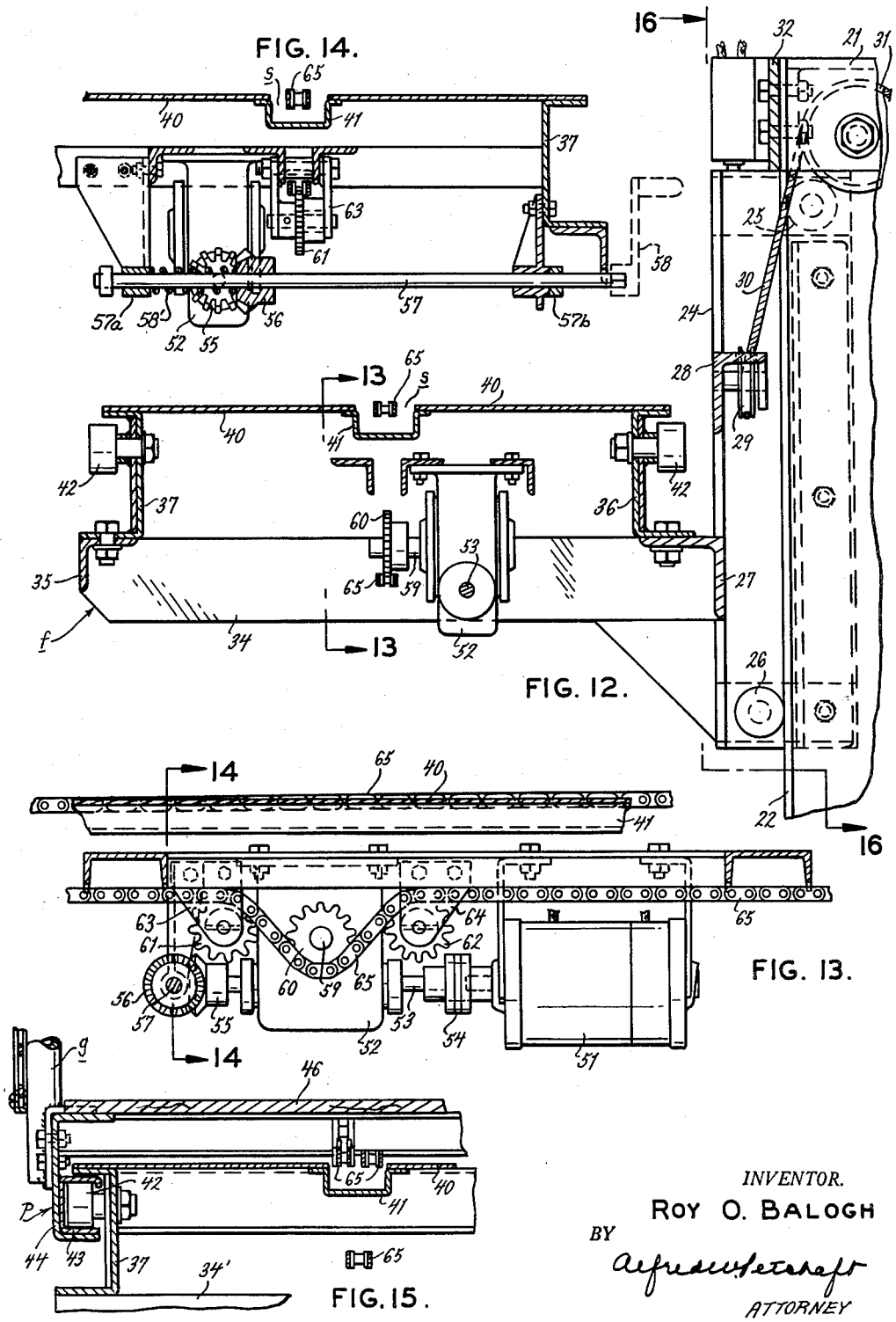

Dec. 20, 1960 R. O. BALOGH 2,965,191
TOWER VEHICLES
Filed Jan. 14, 1955 7 Sheets-Sheet 6
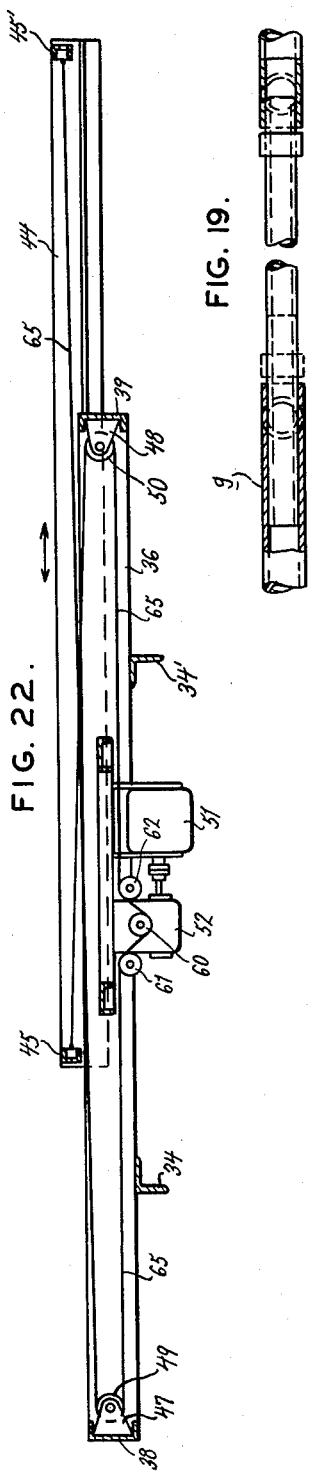
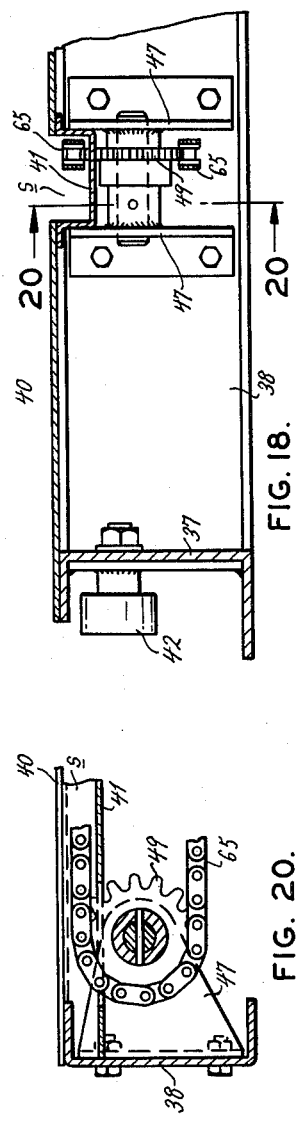
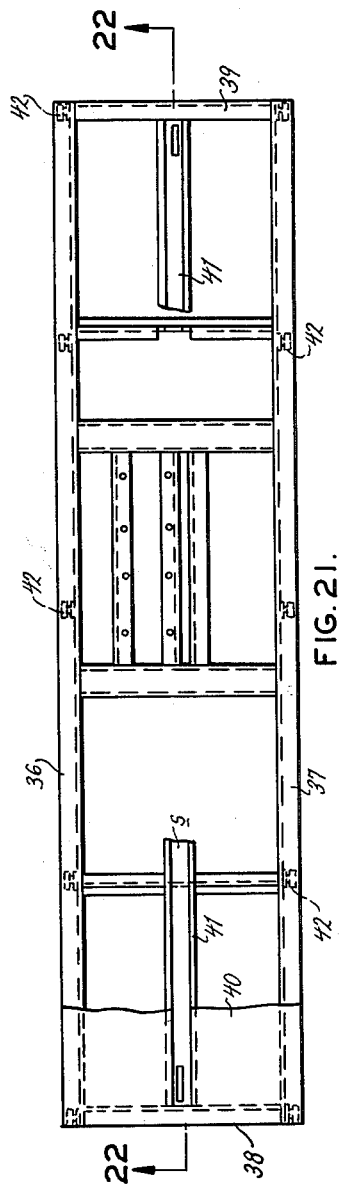
INVENTOR.
ROY O. BALOGH
BY
ATTORNEY Dec. 20, 1960  R. O. BALOGH  2,965,191
TOWER VEHICLES
Filed Jan. 14, 1955  7 Sheets-Sheet 7

INVENTOR.
ROY O. BALOGH
BY
*Alfred W. Petchaft*
ATTORNEY

United States Patent Office 2,965,191
Patented Dec. 20, 1960

2,965,191

TOWER VEHICLES

Roy O. Balogh, Clayton, Mo., assignor to McCabe-Powers Body Company, a corporation of Missouri Filed Jan. 14, 1955, Ser. No. 481,780

7 Claims. (Cl. 182—63)

This invention relates in general to certain new and useful improvements in tower vehicles and, more particularly, to a tower structure for use in the servicing of elevated utility equipment, such as power lines, transformer poles, street-lighting standards, and the like.

It is the primary object of the present invention to provide a tower vehicle having an elevating work platform which is capable of transversely shifting movement at right angles to its vertical axis and can be conveniently stopped and locked in a number of different positions.

It is another object of the present invention to provide a tower vehicle having an elevating and transversely shifting platform which is simply and durably constructed in a unique manner to provide a relatively inexpensive, but sturdy, track structure along which the work platform may traverse and which, in lowered position, is substantially close to the level of the vehicle floor to afford easy access by workmen.

It is another object of the present invention to provide a work platform for a tower vehicle which can be controlled by workmen from the platform when the platform is in elevated position.

With the above and other objects in view, my invention resides in the novel features of form, construction, arrangement, and combination of parts presently described and pointed out in the claims.

In the accompanying drawings (seven sheets)—

Figure 1 is a fragmentary side elevational view of a motor vehicle equipped with an elevating tower constructed in accordance with and embodying the present invention;

Figures 2 and 3 are fragmentary sectional views taken along lines 2—2 and 3—3, respectively, of Figure 1;

Figure 4 is a fragmentary sectional view taken along line 4—4 of Figure 3;

Figure 5 is a rear end elevational view of a vehicle equipped with the elevating tower of the present invention;

Figure 6 is a fragmentary sectional view taken along line 6—6 of Figure 5;

Figure 7 is a fragmentary sectional view taken along line 7—7 of Figure 6;

Figure 1:
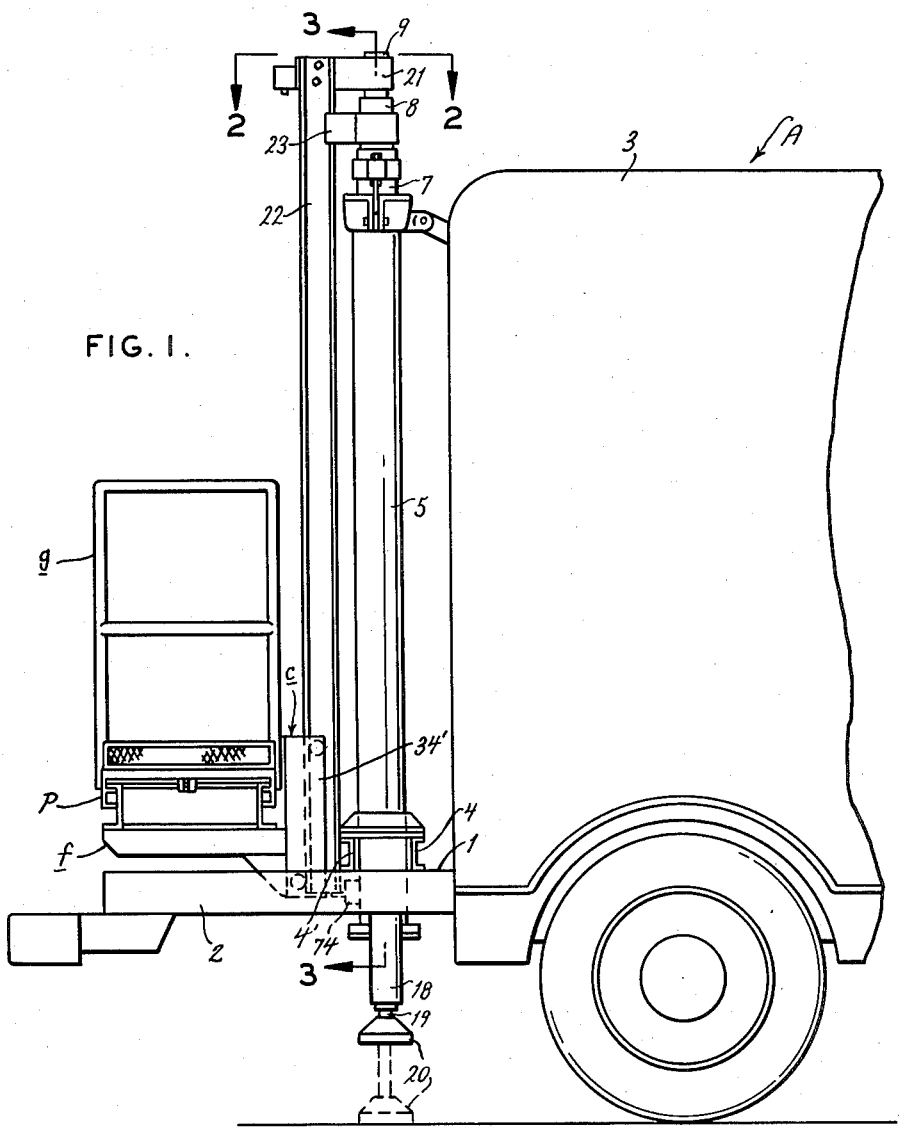
Figure 2:
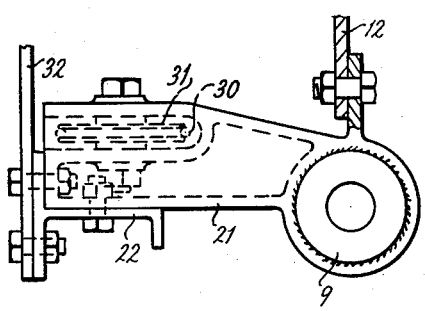
Figure 23:
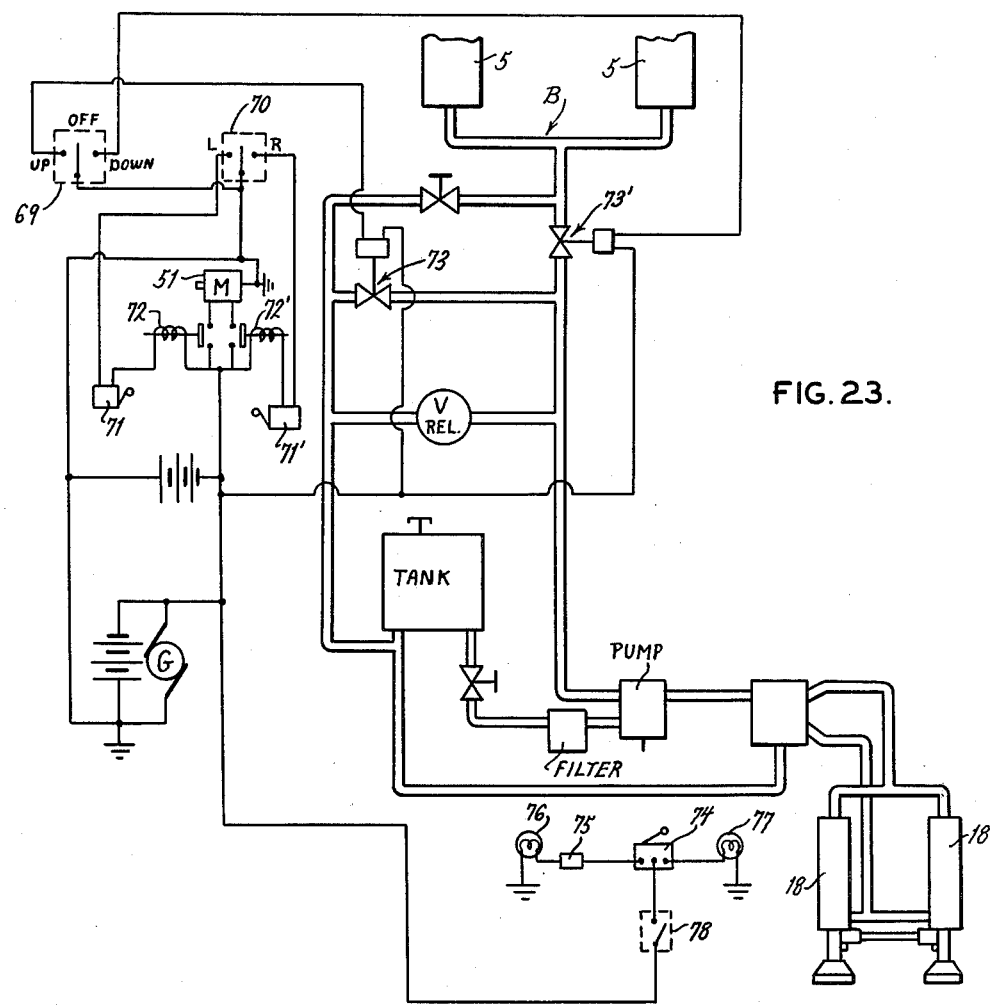
Figure 24:
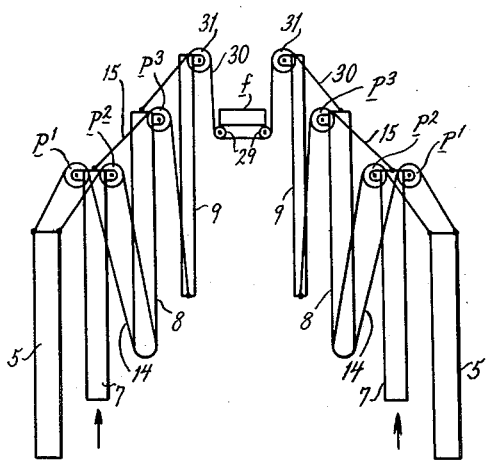

Figures 8, 9, 10, and 11 are fragmentary sectional views taken along lines 8—8, 9—9, 10—10, and 11—11, respectively, of Figure 3;

Figure 12 is a fragmentary sectional view taken along line 12—12 of Figure 5;

Figure 13 is a fragmentary sectional view taken along line 13—13 of Figure 12;

Figure 14 is a fragmentary sectional view taken along line 14—14 of Figure 13;

Figure 15 is a fragmentary sectional view taken along line 15—15 of Figure 5;

Figure 16 is a fragmentary sectional view taken along line 16—16 of Figure 12;

Figure 17 is a fragmentary sectional view taken along line 17—17 of Figure 16;

Figures 18 and 19 are fragmentary sectional views taken along lines 18—18 and 19—19, respectively, of Figure 5;

Figure 20 is a fragmentary sectional view taken along line 20—20 of Figure 18;

Figure 21 is a fragmentary sectional view taken along line 21—21 of Figure 5;

Figure 22 is a fragmentary sectional view taken along line 22—22 of Figure 21;

Figure 23 is a diagrammatic view of the hydraulic and electrical system forming a part of the present invention; and Figure 24 is a diagrammatic view of the pulley and cable system forming a part of the present invention.

Referring now in more detail and by reference characters to the drawings, which illustrate a preferred embodiment of the present invention, A designates a motor vehicle having a rearwardly extending horizontal truck floor 1 which is conventionally mounted on longitudinal frame members 2 of the vehicle chassis and is spaced rearwardly at its front margin from the back wall of a conventional cab or passenger compartment 3. The truck body 1 is also provided with vertically spaced transverse beams 4, 4', located adjacent to the back wall of the cab or passenger compartment 3. Attached at their lower ends to, and extending vertically upwardly from, each of the beams 4, 4', adjacent to the rear wall of the cab 3 are tubular tower legs 5 rigidly connected to each other at their upper ends by a cross-frame 6 in the formation of a two-legged vertical tower structure. Each of the tubular tower legs 5 is internally provided with concentric telescoped tubes 7, 8, 9, respectively connected in pairs by cross-frames 10, 11, 12. The interior of the legs 5 are machined to receive a head 13 formed on the lower end of the tube 7 in the provision of hydraulically actuated rams which are connected to a hydraulic system B, as shown in Figure 23. The tubes 7 may be raised through displacement by hydraulic fluid under pressure imposed by a pump or any other suitable hydraulic driving mechanism. The tube 7 and all associated structure is lowered by gravity as fluid is released. The intermediate cross-frame 10 is provided with pairs of pulleys $p^1$, $p^2$. The cross-frame 11 is provided with a pair of pulleys $p^3$, all of which are operatively interconnected by a pair of cables 14, 15. Each of the cables run through guide brackets 16, 16', respectively fastened on the cross-frames 6, 10, and are conventionally fastened in bracket plates 17, 17'. Thus, as the tubes 7 rise, the pulley-and-cable system will cause the tubes 8, 9, to rise upwardly also.

Rigidly mounted upon the outer ends of the transverse beams 4, 4', and extending vertically downwardly therefrom in parallel relation to the tubular tower legs 5 are hydraulic jacks 18 provided with downwardly projecting piston rods 19 having ground-engaging foot plates 20. The jacks 18 are also connected into the hydraulic system substantially as shown in Figure 23 and serve to stabilize and immobilize the chassis when the tower structure is in actual use.

Welded or otherwise suitably mounted upon the uppermost ends of the tubes 9 are rearwardly extending horizontal brackets 21 for bolted securement to the upper ends of vertical slide rails 22 which extend downwardly therefrom in rearwardly spaced parallel relation to the nested or telescoped tubes 7, 8, 9, and tower legs 5 and extending slidably through stabilizing brackets 23, which are, in turn, welded or otherwise rigidly mounted upon the upper ends of the tubes 8. Mounted for vertically slidable movement upon the rails 22 is a platform carriage $c$ comprising spaced parallel side channels 24 operatively provided with upper and lower rollers 25, 26, for engagement with the rails 22. The channels 24 are transversely connected by substantially rigid horizontal beams 27, 28, the latter being provided with a pair of pulleys 29 around which a cable 30 is trained. The cable 30 extends upwardly from the pulleys 29 and is also trained over pulleys 31 operatively mounted in a cross-frame 32 which rigidly connects the upper ends of the slide rails 22. The cable 30 extends downwardly from the pulleys 31 and is rigidly connected to the upper end of the tubes 8 by means of brackets 33, all as best seen in Figure 16.

The beam 27 is welded at its ends to forwardly extending side beams 34, 34', which are, in turn, integrally connected at their rear ends by a transverse beam 35, the four beams 27, 34, 34', and 35 constituting an extremely strong integral rectangular platform frame $f$. Bolted to, and extending upwardly from, the beams 27, 35, are horizontal channels 36, 37, respectively, which project transversely and equidistantly outwardly on either side of the frame $f$ and are cross-connected at their opposite ends by end beams 38, 39, and a cross-plate 40, which is provided with a central slot $s$ and a downwardly projecting U-shaped guard channel 41. The channels 36, 37, are also operatively provided with horizontally journaled sets of rollers 42 for shiftably supporting a platform P which comprises spaced parallel horizontal channels 43 which are welded to somewhat larger horizontal channels 44, the latter being cross-connected at their opposite ends by end-beams 45, 45', in the provision of a rectangular framework for supporting a platform floor 46 and a conventional guard rail structure $g$ which forms a rectangular enclosure around the entire periphery of the floor 46. The end beams 38, 39, are centrally provided with inwardly projecting bracket plates 47, 48, respectively, which serve as journal supports for sprockets 49, 50. Rigidly mounted centrally within the frame $f$ is a reversible electric motor 51 and a conventional gear type speed reducer 52 having a drive shaft 53 which is connected to the electric motor through a coupling 54. The drive shaft 53 extends through the speed reducer and extends outwardly from the other side thereof, being provided on such projecting end with a bevel gear 55 which meshes with a complementary bevel gear 56 pinned to a shaft 57 suitably journaled at 57a, 57b, in, and projecting at one end outwardly beyond, the frame $f$ for receiving a manually operated emergency handle 58. Interposed between the speed reducer 52 and journal 57a and encircling the shaft 57 is a spring 58' which normally biases the bevel gear 56 out of engagement with the bevel gear 55, all as best seen in Figure 14. The shaft 57 may be shifted axially by means of handle 58 so that bevel gear 56 engages bevel gear 55, in which case the handle 58 may be used to shift the platform P transversely in either direction.

The speed reducer 52 is also provided with a driven shaft 59 having a sprocket 60 which is located between two idler sprockets 61, 62, the latter being respectively journaled in bracket plates 63, 64, which are, in turn, rigidly bolted to convenient portions of the frame $f$. Trained tightly around the sprockets 49, 50, 60, 61, and 62, substantially as shown in Figures 13 and 20, is a sprocket chain 65 which is fastened at its opposite ends to the end beams 45, 45', respectively. It will thus be evident that when the motor 51 is rotated in one direction, the platform P will be shifted transversely in one direction with respect to the frame $f$ and its associated channels 43, 44. Similarly, when the motor 51 is rotated in the other direction, the platform P will likewise be shifted transversely in the opposite direction.

Suitably secured to any convenient portion of the guard rail structure is a control box 66 having two manually operable switch handles 67, 68. The control box 66 contains conventional electrical switches 69, 70, adapted for operation by the switch handles 67, 68, respectively. As will be seen by reference to Figure 23, the switch 70 controls the electric circuit to the motor 51 through limit switches 71, 71', and solenoids 72, 72', the limit switches 71, 71', being respectively mounted at the opposite ends of the platform P to cut off current to the motor 51 automatically as the platform P reaches either of its outer limits of transverse travel. The switch 69 is similarly connected to solenoid-operated valves 73, 73', which are operatively interposed in the hydraulic system, as shown in Figure 23, to control the upward and downward movement of the tower structure.

Finally, a limit switch 74 is suitably mounted on the truck chassis 1 in line with the lower end of one of the side rails 22, so that when the tower structure is fully lowered, the switch 74 will be closed, completing a circuit through a flasher 75 and signal lights 76, 77, located in the cab and on the control box 66, respectively, so that both the truck driver and the workmen on the platform P will know when the tower has safely arrived at lowered position. The limit switch 74 is preferably connected to the electrical system of the truck through a manual switch 78, so that the signal lights 76, 77, may be disconnected when desired.

It should be understood that changes and modifications in the form, construction, arrangement, and combination of the several parts of the tower vehicle may be made and substituted for those herein shown and described without departing from the nature and principle of my invention.

Having thus described my invention, what I claim and desire to secure by Letters Patent is:

1. A portable tower comprising a mobile base, a vertically extensible structure mounted upon the base, power driven means for extending the vertically extensible structure, spaced vertical rails attached to the upper end of the vertically extensible structure and extending downwardly therefrom to the base when the vertically extensible structure is in nonextended position, a frame mounted for vertically slidable movement on said vertical rails, a work-platform carried by said frame, means for shifting said work platform along said frame laterally with respect to the vertically extensible structure, and means operatively connecting the vertically slidable frame with the upper portion of the vertically extensible structure for causing the frame to assume a position substantially adjacent to the base when the vertically extensible structure is fully retracted and correspondingly causing the frame to shift upwardly as the vertically extensible structure is extended upwardly so that the frame is substantially adjacent to the uppermost end of the vertically extensible structure when such vertically extensible structure is fully extended.

2. A portable tower comprising a mobile base, a vertically extensible structure mounted upon the base, power driven means for extending the vertically extensible structure, spaced vertical rails attached to the upper end of the vertically extensible structure and extending downwardly therefrom to the base when the vertically extensible structure is in nonextended position, a frame mounted for vertically slidable movement on said vertical rails, a horizontal trackway carried by the frame and projecting laterally with respect thereto, a work-platform shiftably mounted on said horizontal trackway, means for shifting said work platform along said horizontal trackway, and means operatively connecting the vertically slidable frame with the upper portion of the vertically extensible structure for causing the frame to assume a position substantially adjacent to the base when the vertically extensible structure is fully retracted and correspondingly causing the frame to shift upwardly as the vertically extensible structure is extended upwardly so that the frame is substantially adjacent to the uppermost end of the vertically extensible structure when such vertically extensible structure is fully extended.

3. A portable tower comprising a mobile base, a vertically extensible structure mounted upon the base, power driven means for extending the vertically extensible structure, spaced vertical rails attached to the upper end of the vertically extensible structure and extending downwardly therefrom to the base when the vertically extensible structure is in nonextended position, a frame mounted for vertically slidable movement on said vertical rails, a horizontal trackway carried by the frame and projecting laterally with respect thereto, a horizontal work-platform shiftably mounted on said horizontal trackway, power driven means for shifting said work platform along said horizontal trackway, and means operatively connecting the vertically slidable frame with the upper portion of the vertically extensible structure for causing the frame to assume a position substantially adjacent to the base when the vertically extensible structure is fully retracted and correspondingly causing the frame to shift upwardly as the vertically extensible structure is extended upwardly so that the frame is substantially adjacent to the uppermost end of the vertically extensible structure when such vertically extensible structure is fully extended.

4. A portable tower comprising a mobile base, a vertically extensible structure mounted upon the base, power driven means for extending the vertically extensible structure, spaced vertical rails attached to the upper end of the vertically extensible structure and extending downwardly therefrom to the base when the vertically extensible structure is in nonextended position, a frame mounted for vertically slidable movement on said vertical rails, a horizontal trackway carried by the frame and projecting laterally with respect thereto, a horizontal work-platform shiftably mounted on said horizontal trackway, power driven means for shifting said work platform along said horizontal trackway, auxiliary hand operable means also adapted for shifting the work-platform along the horizontal trackway, and means operatively connecting the vertically slidable frame with the upper portion of the vertically extensible structure for causing the frame to assume a position substantially adjacent to the base when the vertically extensible structure is fully retracted and correspondingly causing the frame to shift upwardly as the vertically extensible structure is extended upwardly so that the frame is substantially adjacent to the uppermost end of the vertically extensible structure when such vertically extensible structure is fully extended.

5. A portable tower comprising a mobile base, a vertically extensible structure mounted upon the base, power driven means for extending the vertically extensible structure, a pair of spaced vertical rails rigidly attached to the upper end of the vertically extensible structure and extending downwardly therefrom to the base when the vertically extensible structure is in non-extended position, a frame mounted for vertically slidable movement on said vertical rails and being disposed at the lower end of said rails in substantially the same level as the base when the vertically extensible structure is in non-extended position, means for shifting the frame vertically upwardly as the vertically extensible structure is extended vertically so that when said structure is in fully extended position the frame will be positioned adjacent the uppermost end thereof, horizontal rails carried by the frame, a work-platform mounted on said rails for laterally shifting movement with respect to the vertically extensible structure, and power driven means for shifting the work-platform to and fro along said horizontal rails, said means for shifting the frame and said power-driven means being structurally correlated to provide simultaneous operation of the one upon actuation of the other.

6. A portable tower comprising a mobile base, a vertically extensible structure mounted upon the base, hydraulically actuated means for extending the vertically extensible structure, a pair of spaced vertical rails rigidly attached to the upper end of the vertically extensible structure and extending downwardly therefrom to the base when the vertically extensible structure is in non-extended position, a frame mounted for vertically slidable movement on said vertical rails and being disposed at the lower end of said rails in substantially the same level as the base when the vertically extensible structure is in non-extended position, means for shifting the frame vertically upwardly as the vertically extensible structure is extended vertically so that when said structure is in fully extended position the frame will be positioned adjacent the uppermost end thereof, horizontal rails carried by the frame, a work-platform mounted on said rails for laterally shifting movement with respect to the vertically extensible structure, and power driven means for shifting the work-platform to and fro along said horizontal rails, said means for shifting the frame and said power-driven means being structurally correlated to provide simultaneous operation of the one upon actuation of the other.

7. A portable tower comprising a mobile base, a plurality of internested vertical frames operatively mounted on the base, said frames being respectively interconnected by compound pulley-and-cable means so that vertical movement of any one of the frames will produce corresponding and relative vertical movement in the other vertical frames whereby the frames are extended vertically with respect to each other, power driven means for vertically actuating said frames, a pair of vertical rails rigidly attached to the upper end of the uppermost frame and extending downwardly therefrom, a horizontal frame mounted on said rails for vertically shifting movement with respect thereto, said horizontal frame being disposed adjacent the lowermost end of the vertical rails when the vertical frames are in internested non-extended position, cable-and-pulley means operatively connecting the horizontal frame and the uppermost vertical frame so that when the vertical frame is extended to its uppermost position the horizontal frame will be shifted upwardly to a position adjacent the upper end of the vertical rails, horizontal rails carried by the horizontal frame and projecting laterally outwardly on either side of the vertical frames, a work-platform slidably mounted on the horizontal rails for transversely shifting movement with respect to the vertical frames, and power driven means for effecting laterally shifting movement of the work-platform.

References Cited in the file of this patent

UNITED STATES PATENTS

| | | |
|---|---|---|
| 363,889 | Gillespie | May 31, 1887 |
| 602,403 | Kunkel | Apr. 12, 1898 |
| 713,911 | McPartland | Nov. 18, 1902 |
| 788,171 | Schwerin | Apr. 25, 1905 |
| 1,960,355 | Tamini | May 29, 1934 |
| 2,428,184 | Swindler | Sept. 30, 1947 |
| 2,598,730 | Thompson et al. | June 3, 1952 |
| 2,601,092 | Cardiff | June 17, 1952 |
| 2,605,481 | Burkhart | Aug. 5, 1952 |
| 2,787,343 | Mitchell | Apr. 2, 1957 |

FOREIGN PATENTS

| | | |
|---|---|---|
| 921,172 | Germany | Dec. 9, 1954 |